US012735339B2

(12) United States Patent
Chang et al.

(10) Patent No.: US 12,735,339 B2
(45) Date of Patent: Sep. 15, 2026

(54) EFFICIENT NITROGEN AND PHOSPHORUS REMOVAL PROCESS SYSTEM FOR MARICULTURE TAIL WATER TREATMENT

(71) Applicant: TIANJIN RESEARCH INSTITUTE FOR WATER TRANSPORT ENGINEERING, M.O.T., Tianjin (CN)

(72) Inventors: Fang Chang, Tianjin (CN); Zhendong Li, Tianjin (CN); Lu Zhang, Tianjin (CN); Huiting Li, Tianjin (CN); Yingjie Zhao, Tianjin (CN); Hao Shang, Tianjin (CN); Malan Yi, Tianjin (CN); Tingfeng Wang, Tianjin (CN); Jiangnan Wang, Tianjin (CN)

(73) Assignee: TIANJIN RESEARCH INSTITUTE FOR WATER TRANSPORT ENGINEERING, M.O.T., Tianjin (CN)

( * ) Notice: Subject to any disclaimer, the term of this patent is extended or adjusted under 35 U.S.C. 154(b) by 475 days.

(21) Appl. No.: 18/266,810

(22) PCT Filed: May 16, 2022

(86) PCT No.: PCT/CN2022/093017
§ 371 (c)(1),
(2) Date: Jun. 13, 2023

(87) PCT Pub. No.: WO2023/065653
PCT Pub. Date: Apr. 27, 2023

(65) Prior Publication Data

US 2023/0382778 A1 Nov. 30, 2023

(30) Foreign Application Priority Data

Oct. 19, 2021 (CN) ........................ 202111215939.6

(51) Int. Cl.
*C02F 9/00* (2023.01)
*A01K 63/04* (2006.01)
(Continued)

(52) U.S. Cl.
CPC ................ *C02F 9/00* (2013.01); *C02F 3/104* (2013.01); *C02F 3/108* (2013.01); *C02F 3/307* (2013.01);
(Continued)

(58) Field of Classification Search
CPC .. C02F 9/00; C02F 3/104; C02F 3/108; C02F 3/307; C02F 1/001; C02F 1/004;
(Continued)

(56) References Cited

U.S. PATENT DOCUMENTS

2004/0154988 A1* 8/2004 Sheets, Sr. ................ B03C 3/41 210/721
2011/0000854 A1* 1/2011 Nichols .................. C02F 1/288 210/666
(Continued)

FOREIGN PATENT DOCUMENTS

CN 109809653 A * 5/2019
CN 110240353 A * 9/2019 ................ C02F 9/00
(Continued)

OTHER PUBLICATIONS

Machine-generated English translation of RU 2323167, generated on Oct. 9, 2025.*

(Continued)

*Primary Examiner* — Fred Prince
(74) *Attorney, Agent, or Firm* — JEEN IP LAW, LLC

(57) ABSTRACT

Disclosed is an efficient nitrogen and phosphorus removal process system for mariculture tail water treatment. The process system comprises a physical filtering device, an efficient biological treatment unit, a flocculation sedimenta-
(Continued)

tion tank, a sand filtering tank, a clean water tank and a sludge tank, wherein the physical filtering device, the efficient biological treatment unit, the flocculation sedimentation tank, the sand filtering tank and the clean water tank are sequentially connected; the physical filtering device, the efficient biological treatment unit, the flocculation sedimentation tank and the sand filtering tank are all connected with the sludge tank through pipelines, and the physical filtering device and the sand filtering tank are both connected with the clean water tank through pipelines. The efficient biological treatment unit is filled with a modified high-hydrophilic wear-resistant filler, and the whole system is provided with a carbon source, a flocculation agent and a directional Phoslock dosing device.

7 Claims, 2 Drawing Sheets

(51) Int. Cl.

| | |
|---|---|
| ***C02F 1/00*** | (2023.01) |
| ***C02F 1/52*** | (2023.01) |
| ***C02F 1/56*** | (2023.01) |
| ***C02F 3/06*** | (2023.01) |
| ***C02F 3/08*** | (2023.01) |
| ***C02F 3/10*** | (2023.01) |
| ***C02F 3/20*** | (2023.01) |
| ***C02F 3/30*** | (2023.01) |
| *C02F 101/10* | (2006.01) |
| *C02F 101/16* | (2006.01) |
| *C02F 103/08* | (2006.01) |

(52) U.S. Cl.
CPC .............. *A01K 63/04* (2013.01); *C02F 1/001* (2013.01); *C02F 1/004* (2013.01); *C02F 1/5245* (2013.01); *C02F 1/5281* (2013.01); *C02F 1/56* (2013.01); *C02F 3/06* (2013.01); *C02F 3/087* (2013.01); *C02F 3/201* (2013.01); *C02F 3/302* (2013.01); *C02F 3/303* (2013.01); *C02F 3/308* (2013.01); *C02F 2101/105* (2013.01); *C02F 2101/16* (2013.01); *C02F 2101/163* (2013.01); *C02F 2101/166* (2013.01); *C02F 2103/08* (2013.01); *C02F 2203/004* (2013.01); *C02F 2203/006* (2013.01); *C02F 2303/14* (2013.01); *C02F 2303/16* (2013.01); *C02F 2305/06* (2013.01); *Y02W 10/10* (2015.05)

(58) Field of Classification Search
CPC ........ C02F 1/5245; C02F 1/5281; C02F 1/56; C02F 3/06; C02F 3/087; C02F 3/201; C02F 3/302; C02F 3/303; C02F 3/308; C02F 2101/105; C02F 2101/16; C02F 2101/163; C02F 2101/166; C02F 2103/08; C02F 2203/004; C02F 2203/006; C02F 2303/14; C02F 2303/16; C02F 2305/06; A01K 63/04; Y02W 10/10
USPC .................. 210/605, 630, 903, 906; 119/227
See application file for complete search history.

(56) References Cited

U.S. PATENT DOCUMENTS

| | | | | |
|---|---|---|---|---|
| 2011/0290189 | A1* | 12/2011 | Myers | A01K 63/00 119/200 |
| 2021/0037796 | A1* | 2/2021 | Tan | A01K 63/003 |

FOREIGN PATENT DOCUMENTS

| | | | | |
|---|---|---|---|---|
| CN | 209797712 U | * | 12/2019 | |
| CN | 111003906 A | * | 4/2020 | C02F 9/00 |
| CN | 210261454 U | * | 4/2020 | |
| CN | 212403647 U | * | 1/2021 | |
| CN | 111777263 B | * | 3/2021 | C02F 9/00 |
| CN | 112624307 A | * | 4/2021 | C02F 3/322 |
| CN | 113772900 A | * | 12/2021 | C02F 3/087 |
| RU | 2323167 C2 | * | 4/2008 | |

OTHER PUBLICATIONS

Machine-generated English translation of CN 109809653, generated on Oct. 9, 2025.*
Machine-generated English translation of CN 110240353, generated on Oct. 9, 2025.*
Machine-generated English translation of CN 112624307, generated on Oct. 9, 2025.*
Machine-generated English translation of CN 113772900, generated on Oct. 9, 2025.*
Machine-generated English translation of CN 209797712, generated on Oct. 9, 2025.*
Machine-generated English translation of CN 210261454, generated on Oct. 9, 2025.*
Machine-generated English translation of CN 111777263, generated on Oct. 9, 2025.*
Machine-generated English translation of CN 111003906, generated on Oct. 9, 2025.*
Machine-generated English translation of CN 212403647, generated on Oct. 9, 2025.*

* cited by examiner

EFFICIENT NITROGEN AND PHOSPHORUS REMOVAL PROCESS SYSTEM FOR MARICULTURE TAIL WATER TREATMENT

CROSS-REFERENCE TO RELATED APPLICATION

This patent application claims the benefit and priority of Chinese Patent Application No. 202111215939.6, filed with the China National Intellectual Property Administration on Oct. 19, 2021, the disclosure of which is incorporated by reference herein in its entirety as part of the present application.

TECHNICAL FIELD

The present disclosure belongs to the field of wastewater treatment, and specifically relates to an efficient nitrogen and phosphorus removal process system for mariculture tail water treatment.

BACKGROUND

China, as a big mariculture country, has an annual mariculture output of more than 20 million tons, accounting for more than 60% of the total marine products in China. In 2020, the annual output of aquatic products in Guangxi is 3.4396 million tons, and the output of aquatic products is 1.9907 tons. In recent years, the mariculture industry in China has developed rapidly, and the aquaculture density has been increasing. At the same time, the environmental problems caused by aquaculture tail water have attracted extensive attention. At present, the mariculture modes in China are still relatively traditional, and mostly open and extensive. The degree of facilities and intensification is relatively low. The untreated tail water is directly discharged or discharged in a substandard manner. Therefore, the deterioration of water quality in aquaculture water and nearby sea areas is caused, the marine ecological environment is further destroyed, and the green and healthy development of mariculture is restricted, so that the technology is contrary to the concept of green development in China, and the construction of ecological civilization is hindered.

Mariculture tail water contains bait, drugs, preparations and metabolic wastes such as fish and shrimp, resulting in eutrophication or water quality deterioration in aquaculture water and adjacent water areas after a large amount of discharge. The aquaculture tail water treatment technologies applied in the world mainly comprise physical treatment technology, electrochemical treatment technology and biological treatment technology. The physical treatment technology only refers to the removal of solid particles, but the development and application of the electrochemical treatment technology has been restricted because of the problems such as high energy consumption and electrode passivation. The biological treatment technology comprises microbial purification, shellfish purification and constructed wetland purification. At present, the water body is purified by throwing diatoms or unicellular algae and filter-feeding shellfish, but the application scenarios are limited by the aquaculture types and modes, and the treatment effect is poor. Mangrove undercurrent wetland, ecological floating bed with seahorse teeth and other technologies are preferably applied in purifying aquaculture tail water, but these technologies need to occupy large land and run slowly.

The microbial treatment process based on activated sludge method has been widely used in municipal wastewater treatment and industrial wastewater treatment, but the quality and quantity of mariculture wastewater have different characteristics. Firstly, the discharge value is very large but the pollutant content is relatively low. For example, the inorganic nitrogen content is only 3-5 mg/L and the COD content is 20-40 mg/L, and the inorganic nitrogen content and the COD content are lower than that of industrial wastewater and domestic wastewater. At the same time, the dissolved oxygen content is very high, even close to saturation. In addition, due to the particularity of pollutant structure in mariculture wastewater, and the salinity effect and ionic strength effect of seawater, the treatment difficulty and complexity are greatly increased. At the same time, the existing microbial treatment method still has the disadvantages of long residence time, large occupied area and easy loss of microbial agents. At present, the existing technology on the market is difficult to meet the first-class standard requirements in the Discharge Requirements of Mariculture Water (SC/T9103-2007).

SUMMARY

The present disclosure aims to provide an efficient nitrogen and phosphorus removal process system for mariculture tail water treatment. After the process system is used for treating mariculture tail water, it can meet the first-class standard requirements in the Discharge Requirements of Mariculture Water (SC/T9103-2007). The system has the characteristics of high nitrogen and phosphorus removal efficiency, small occupied area, low operating cost, no secondary pollution, convenience in management and the like.

The present disclosure is realized through the following technical scheme.

An efficient nitrogen and phosphorus removal process system for mariculture tail water treatment comprises a physical filtering device, an efficient biological treatment unit, a flocculation sedimentation tank, a sand filtering tank, a clean water tank and a sludge tank, wherein the physical filtering device, the efficient biological treatment unit, the flocculation sedimentation tank, the sand filtering tank and the clean water tank are sequentially connected; the physical filtering device, the efficient biological treatment unit, the flocculation sedimentation tank and the sand filtering tank are all connected with the sludge tank through pipelines; and the physical filtering device and the sand filtering tank are both connected with the clean water tank through pipelines.

The efficient biological treatment unit comprises a biological aerated filter 1, an anaerobic tank, a biological aerated filter 2, a modified high-hydrophilic wear-resistant filler and a glass fiber reinforced plastic grid cover plate, the biological aerated filter 1, the anaerobic tank and the biological aerated filter 2 are sequentially connected, the modified high-hydrophilic wear-resistant filler is filled in the biological aerated filter 1, the anaerobic tank and the biological aerated filter 2, the glass fiber reinforced plastic grid cover plate is located at the upper parts of the biological aerated filter 1, the anaerobic tank and the biological aerated filter 2, and the filler is pressed to prevent floating.

The tank volume ratio of the biological aerated filter 1, the anaerobic tank to the biological aerated filter 2 is 2:4:1, the filling volume of the modified high-hydrophilic wear-resistant filler in the biological aerated filter 1, the anaerobic tank and the biological aerated filter 2 is not less than 60% of the tank volume, and the biological aerated filter and the anaerobic tank are respectively inoculated with efficient salt-tolerant nitrifying bacteria and denitrifying bacteria.

A microporous aeration disc is installed at the bottom of the biological aerated filter, a blower is added to aerate the interior of the tank, a diving mixer is installed in the anaerobic tank and is made of an anticorrosive material, and an external carbon source dosing device of the anaerobic tank is used as an emergency carbon source supplementary device.

The modified high-hydrophilic wear-resistant filler is made of polyurethane as a carrier of microorganisms by adopting a suspended ball combined filler method, the carrier material is provided with active groups such as amino, carboxyl, epoxy and other groups, the void ratio is over 96%, the specific surface area is 6000-15000 $m^2/m^3$, the density of immobilized microorganisms is close to that of water, and the immobilized microorganisms are suspended in water.

The flocculation sedimentation tank is externally connected with an agent dosing device, and the agent mainly comprises polyaluminum chloride (PAC) and polyacrylamide (PAM) and is added with auxiliary lanthanum-containing directional Phoslock.

The physical filtering device can be a microfiltration machine, a curved screen and other devices with an automatic backwashing function, and the device is installed on a biological tank.

In the process system, except that the water body is lifted by a pump once before the physical filtering device, all subsequent water bodies are realized by gravity.

The present disclosure has the following advantages.

Firstly, the process system is rapid in biofilm formation, short in start-up period of biological treatment, and the longest start-up time does not exceed 20 days.

Secondly, the process system is short in hydraulic retention time, high in treatment speed and high in nitrogen and phosphorus removal efficiency.

Thirdly, alkalinity is not needed additionally, and few carbon sources are added, so that the phosphorus removal selectivity is high, and the agent is saved.

Fourthly, the biological filler is of an eutrophication-subfiltration-anoxia structure, the consumption of dissolved oxygen is low, and the process is free of a sludge reflux device, so that the energy consumption is saved.

Fifthly, organic surplus sludge is hardly produced in the biological treatment section, so that sludge reduction is reduced.

Sixthly, the process system is resistant to impact, stable in effluent, intermittent in operation and simple in operation and maintenance.

Aiming at the problems of high salinity, large discharge amount, low carbon-nitrogen ratio, strict discharge standard and the like in mariculture tail water, the present disclosure adopts the OAO biological treatment process. The modified high hydrophilic wear-resistant filler is taken as a carrier to realize efficient immobilization of microorganisms, so that sludge is not easy to lose, the microbial concentration is high, the activity is strong, and the denitrification efficiency is high. By adding a small amount of lanthanum-containing directional Phoslock, the dosage of PAM and PAC is greatly reduced, the phosphorus removal effect is improved, and the sludge yield is reduced. The process system solves the key problem that the mariculture tail water microbiological treatment is slow in start-up, unstable in operation and complicated in regulation and control, and has the characteristics of simple process, low operation cost, energy saving, good treatment effect and the like.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. The following description of at least one exemplary embodiment is merely illustrative and definitely is not construed as any limitation on the present disclosure and use of the present disclosure. All other embodiments obtained by those skilled in the art based on the embodiments of the present disclosure without creative efforts shall fall within the protection scope of the present disclosure.

Embodiment I

Figure 1:
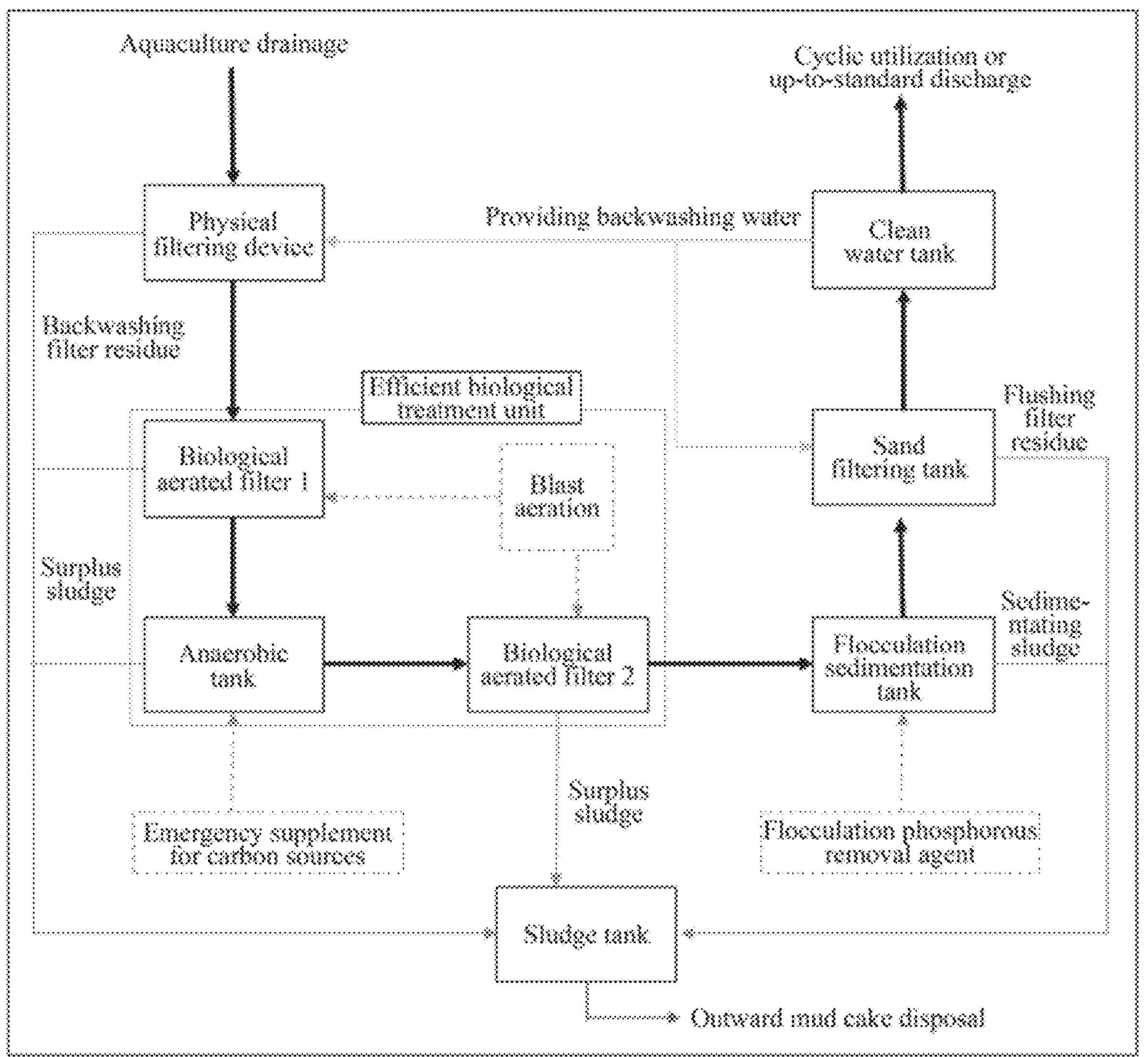
FIG. 1 is a structural schematic diagram of the present disclosure.
Figure 2:
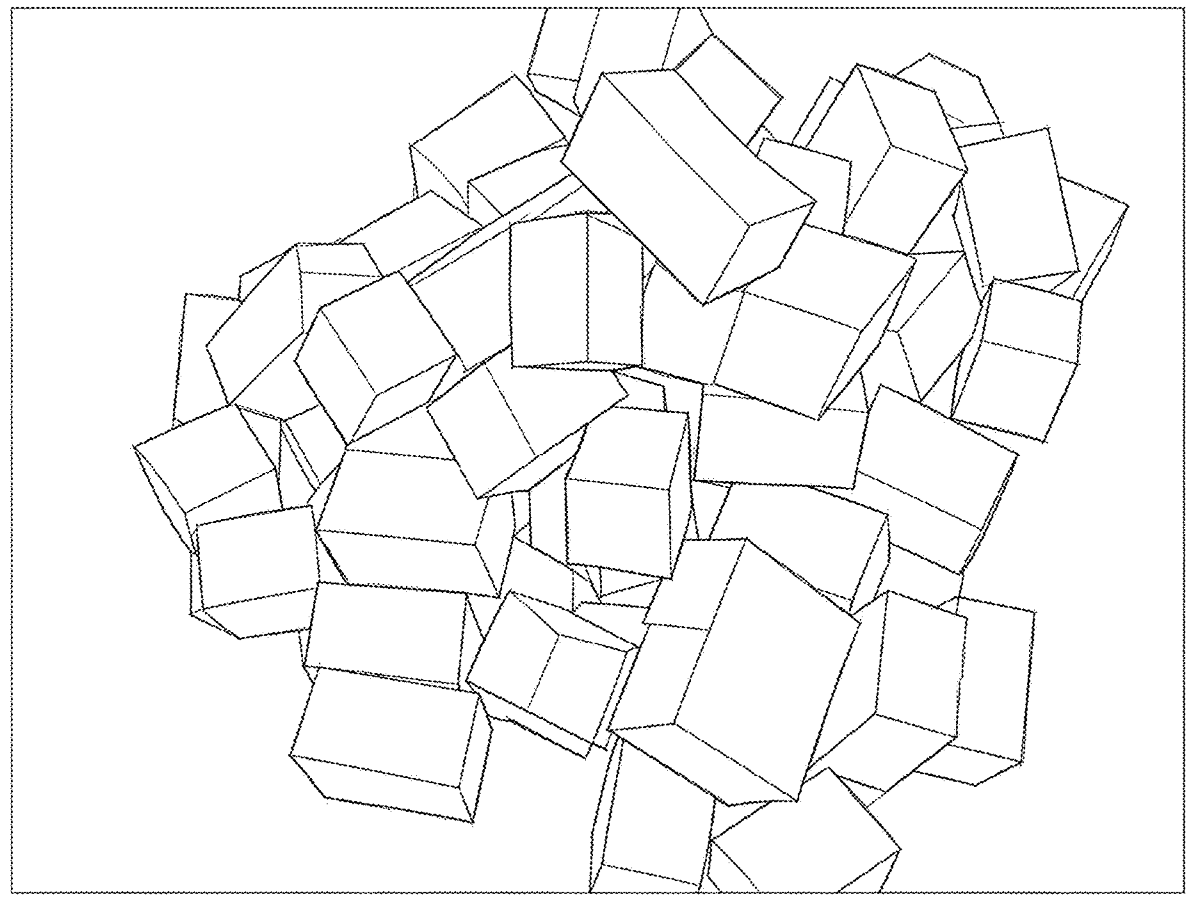
FIG. 2 is a diagram of a modified high-hydrophilic wear-resistant filler.

Referring to FIG. 1, the present disclosure provides an efficient nitrogen and phosphorus removal process system for mariculture tail water treatment. The process system comprises a physical filtering device, an efficient biological treatment unit, a flocculation sedimentation tank, a sand filtering tank, a clean water tank and a sludge tank. The physical filtering device, the efficient biological treatment unit, the flocculation sedimentation tank, the sand filtering tank and the clean water tank are sequentially connected. The physical filtering device, the efficient biological treatment unit, the flocculation sedimentation tank and the sand filtering tank are all connected with the sludge tank through pipelines. The physical filtering device and the sand filtering tank are both connected with the clean water tank through pipelines.

The efficient biological treatment unit comprises a biological aerated filter 1, an anaerobic tank, a biological aerated filter 2, a modified high-hydrophilic wear-resistant filler and a glass fiber reinforced plastic grid cover plate. The biological aerated filter 1, the anaerobic tank and the biological aerated filter 2 are sequentially connected. The modified high-hydrophilic wear-resistant filler is filled in the biological aerated filter 1, the anaerobic tank and the biological aerated filter 2. The glass fiber reinforced plastic grid cover plate is located at the upper parts of the biological aerated filter 1, the anaerobic tank and the biological aerated filter 2. The filler is pressed to prevent floating.

The tank volume ratio of the biological aerated filter 1, the anaerobic tank to the biological aerated filter 2 is 2:4:1. The filling volume of the modified high-hydrophilic wear-resistant filler in the biological aerated filter 1, the anaerobic tank and the biological aerated filter 2 is not less than 60% of the tank volume. The biological aerated filter and the anaerobic tank are respectively inoculated with efficient salt-tolerant nitrifying bacteria and denitrifying bacteria.

A microporous aeration disc is installed at the bottom of the biological aerated filter. A blower is added to aerate the interior of the tank. A diving mixer is installed in the anaerobic tank and is made of 316L stainless steel. An external carbon source dosing device of the anaerobic tank is used as an emergency carbon source supplementary device. The common carbon sources comprise glucose, methyl alcohol, ethyl alcohol, sodium acetate, corn starch and the like.

The modified high-hydrophilic wear-resistant filler is made of polyurethane as a carrier of microorganisms by adopting a suspended ball combined filler method. The carrier material is provided with active groups such as amino, carboxyl, epoxy and other groups. The void ratio is over 96%. The specific surface area is 6000-15000 $m^2/m^3$. The density of immobilized microorganisms is close to that of water, and the immobilized microorganisms are suspended in water.

The flocculation sedimentation tank is externally connected with an agent dosing device, and the agent mainly comprises polyaluminum chloride (PAC) and polyacrylamide (PAM) and is added with auxiliary lanthanum-containing directional Phoslock.

The physical filtering device can be a microfiltration machine, a curved screen and other devices with an automatic backwashing function, and the device is installed on a biological tank.

In the working process of the process system, the discharged water from a mariculture pond or a factory culture pond is extracted once by a water pump and enters a physical filtering device (such as a microfilter). The filtered water enters the biological aerated filter 1, and the backwashing water containing large particles enters a sludge pond. In the biological aerated filter 1, the solution protein and ammonia nitrogen in the water can be converted into nitrite nitrogen under the action of nitrifying bacteria and further converted into nitrate nitrogen. The overflow water from the biological aerated filter 1 enters the anaerobic tank, and the nitrate nitrogen and nitrite nitrogen in the water body are converted into nitrogen under the action of denitrifying bacteria, so that denitrification is realized, and meanwhile, refractory organic substances (such as antibiotics and other drugs) can be hydrolyzed. The overflow water from the upper part of the biological aerated filter 2 enters the flocculation sedimentation tank, and microorganisms decompose organic matters to reduce COD. At the same time, phosphorus accumulating bacteria realize aerobic phosphorus absorption. The overflow water from the upper part of the biological aerated filter 2 enters the flocculation sedimentation tank, and a small amount of lanthanum-containing directional Phoslock is added to realize the deep removal of phosphorus in the water body. Under the action of flocculants such as PAC and PAM, phosphorus is settled to the bottom of the tank body and enters the sludge tank through the sludge discharge pipe. The overflow water from the upper part of the flocculation sedimentation tank enters the sand filtering tank, is further filtered by quartz sand and then enters the clean water tank.

The sand filtering tank is cleaned regularly, and the backwashed filter residue enters the sludge tank. The water in the clean water tank can be recycled or discharged up to the standard, and at the same time, clean water for backwashing can be provided for the physical filtering device and sand filtering tank. A sludge hopper is arranged at the bottom of the sludge tank. As the sludge yield is small, sludge is discharged only by gravity compression. The water quality treated by this process system can meet the first-class standard requirements in the Discharge Requirements of Mariculture Water (SC/T9103-2007).

Embodiment II

The efficient nitrogen and phosphorus removal process system for mariculture tail water treatment is used for treating the industrial aquaculture tail water of South American shrimps in Hainan, and the treated effluent water quality meets the first-class standard requirements in the Discharge Requirements of Mariculture Water (SC/T9103-2007). The water quality indexes of inflow and effluent water are as follows through the monitoring data of a third party:

| Serial numbers | Indexes | Units | First-class standard requirements in SC/T9103-2007 | Inflow water quality | Effluent water quality |
|---|---|---|---|---|---|
| 1 | pH | Dimensionless | 7.0-8.5 | 7.5 | 7.09 |
| 2 | Chemical oxygen demand ($COD_{Mn}$) | mg/L | ≤10 | 1.4 | 2.7 |
| 3 | Biochemical oxygen demand ($BOD_5$) | mg/L | ≤6 | 4 | 3 |
| 4 | Active phosphorus (in terms of P) | mg/L | ≤0.05 | 0.078 | 0.008 |
| 5 | Ammonia Inorganic nitrogen | mg/L | ≤0.5 | 21 | 0.343 |
| 6 | Copper Nitrate | mg/L | ≤0.1 | 0.0013 | 0.0009 |
| 7 | Zinc Nitrite | mg/L | ≤0.2 | 0.082 | 0.073 |

Note:
inflow water refers to the aquaculture tail water discharged from the culture pond, and effluent water refers to the discharged water treated by treatment facilities.

Therefore, it is observed that after the mariculture tail water is treated by the process system, all indexes can meet the first-class standard requirements in the Discharge Requirements of Mariculture Water (SC/T9103-2007), and the standard discharge can be achieved.

Although the specific embodiments of the present disclosure have been described above, those skilled in the art should understand that the specific embodiments we have described are only illustrative, only used for explaining the present disclosure, but not for limiting the present disclosure. Obvious changes or variations which belong to the technical scheme of the present disclosure are still within the scope of protection of the present disclosure.

What is claimed is:

1. An efficient nitrogen and phosphorus removal process system for mariculture tail water treatment, comprising a physical filtering device, biological treatment unit, a flocculation sedimentation tank, a sand filtering tank, a clean water tank and a sludge tank, wherein the physical filtering device, the biological treatment unit, the flocculation sedimentation tank, the sand filtering tank and the clean water tank are sequentially connected; the physical filtering device, the biological treatment unit, the flocculation sedimentation tank and the sand filtering tank are all connected with the sludge tank through pipelines; and the physical filtering device and the sand filtering tank are both connected with the clean water tank through pipelines;

wherein the biological treatment unit comprises a biological aerated filter 1, an anaerobic tank, a biological aerated filter 2, a modified hydrophilic wear-resistant filter and a glass fiber reinforced plastic grid cover plate, the biological aerated filter 1, the anaerobic tank and the biological aerated filter 2 are sequentially connected, the modified hydrophilic wear-resistant filter is filled in the biological aerated filter 1, the anaerobic tank and the biological aerated filter 2, the glass fiber reinforced plastic grid cover plate is located at the upper parts of the biological aerated filter 1, the anaerobic tank and the biological aerated filter 2, and the modified hydrophilic wear-resistant filter is pressed to prevent floating.

2. The nitrogen and phosphorus removal process system for mariculture tail water treatment according to claim 1, wherein the tank volume ratio of the biological aerated filter 1, the anaerobic tank to the biological aerated filter 2 is 2:4:1, the filling volume of the modified hydrophilic wear-resistant filter in the biological aerated filter 1, the anaerobic tank and the biological aerated filter 2 is not less than 60% of the tank volume, and the biological aerated filter 1, the biological aerated filter 2 and the anaerobic tank are respectively inoculated with salt-tolerant nitrifying bacteria and denitrifying bacteria.

3. The nitrogen and phosphorus removal process system for mariculture tail water treatment according to claim 2, wherein the modified hydrophilic wear-resistant filter is made of polyurethane as a carrier of microorganisms by adopting a suspended ball combined filter method, the carrier material is provided with an active groups selected from the group consisting of amino, carboxyl, and epoxy groups, the void ratio is over 96%, the specific surface area is 6000-15000 $m^2/m^3$, the density of immobilized microorganisms is close to that of water, and the immobilized microorganisms are suspended in water.

4. The nitrogen and phosphorus removal process system for mariculture tail water treatment according to claim 1, wherein a microporous aeration disc is installed at the bottom of the biological aerated filter 1 and the biological aerated filter 2, a blower is added to aerate the interior of the biological aerated filter 1 and the biological aerated filter 2, a diving mixer is installed in the anaerobic tank and is made of an anticorrosive material, and an external carbon source dosing device of the anaerobic tank is used as an emergency carbon source supplementary device.

5. The nitrogen and phosphorus removal process system for mariculture tail water treatment according to claim 1, wherein the modified hydrophilic wear-resistant filter is made of polyurethane as a carrier of microorganisms by adopting a suspended ball combined filter method, the carrier material is provided with an active groups selected from the group consisting of amino, carboxyl, and epoxy groups, the void ratio is over 96%, the specific surface area is 6000-15000 $m^2/m^3$, the density of immobilized microorganisms is close to that of water, and the immobilized microorganisms are suspended in water.

6. The nitrogen and phosphorus removal process system for mariculture tail water treatment according to claim 1, wherein the flocculation sedimentation tank is externally connected with an agent dosing device, and the agent comprises polyaluminum chloride (PAC) and polyacrylamide (PAM) and is added with auxiliary lanthanum-containing directional Phoslock.

7. A nitrogen and phosphorus removal process system for mariculture tail water treatment, comprising a physical filtering device, a biological treatment unit, a flocculation sedimentation tank, a sand filtering tank, a clean water tank and a sludge tank, wherein the physical filtering device, the biological treatment unit, the flocculation sedimentation tank, the sand filtering tank and the clean water tank are sequentially connected; the physical filtering device, the biological treatment unit, the flocculation sedimentation tank and the sand filtering tank are all connected with the sludge tank through pipelines; and the physical filtering device and the sand filtering tank are both connected with the clean water tank through pipelines;

wherein the biological treatment unit comprises a biological aerated filter 1, an anaerobic tank, a biological aerated filter 2, a modified hydrophilic wear-resistant filter and a glass fiber reinforced plastic grid cover plate, the biological aerated filter 1, the anaerobic tank and the biological aerated filter 2 are sequentially connected, the modified hydrophilic wear-resistant filter is filled in the biological aerated filter 1, the anaerobic tank and the biological aerated filter 2, the glass fiber reinforced plastic grid cover plate is located at the upper parts of the biological aerated filter 1, the anaerobic tank and the biological aerated filter 2, and the modified hydrophilic wear-resistant filter is pressed to prevent floating;

wherein the physical filtering device is selected from the group consisting of a microfiltration machine and a curved screen with an automatic backwashing function; and in the nitrogen and phosphorus removal process system, except that a water body is lifted by a pump once before the physical filtering device, all subsequent water bodies are realized by gravity.

* * * * *